2 Sheets—Sheet 1.

G. W. GREGORY.

Hay Elevator.

No. 1,613.

Reissued Feb. 2, 1864.

WITNESSES:
R. H. Walmsley
Norris Peters

INVENTOR.
Geo. W. Gregory.

N. PETERS, Photo-Lithographer, Washington, D. C.

2 Sheets—Sheet 2.

G. W. GREGORY.

Hay Elevator.

No. 1,613.

Reissued Feb. 2, 1864.

WITNESSES:

R. H. Walmsley

Norris Peters.

INVENTOR.

Geo. W. Gregory.

N. PETERS, Photo-Lithographer, Washington, D. C.

UNITED STATES PATENT OFFICE.

GEORGE W. GREGORY, OF BINGHAMTON, NEW YORK, ASSIGNEE OF E. W. SEYMOUR AND G. W. GREGORY.

IMPROVEMENT IN HAY-ELEVATORS.

Specification forming part of Letters Patent No. 38,872, dated June 9, 1863; Reissue No. 1,613, dated February 2, 1864.

*To all whom it may concern:*

Be it known that ELIAS W. SEYMOUR and GEORGE W. GREGORY, of Binghamton, in the county of Broome and State of New York, invented, made, and applied to use a certain Improvement in Hay-Elevators, known as the "Revolving Hay-Elevator;" and I do hereby declare the following to be a full, clear, and exact description of the same, reference being had to the annexed drawings, making part of this specification, wherein, in—

Figure 1:
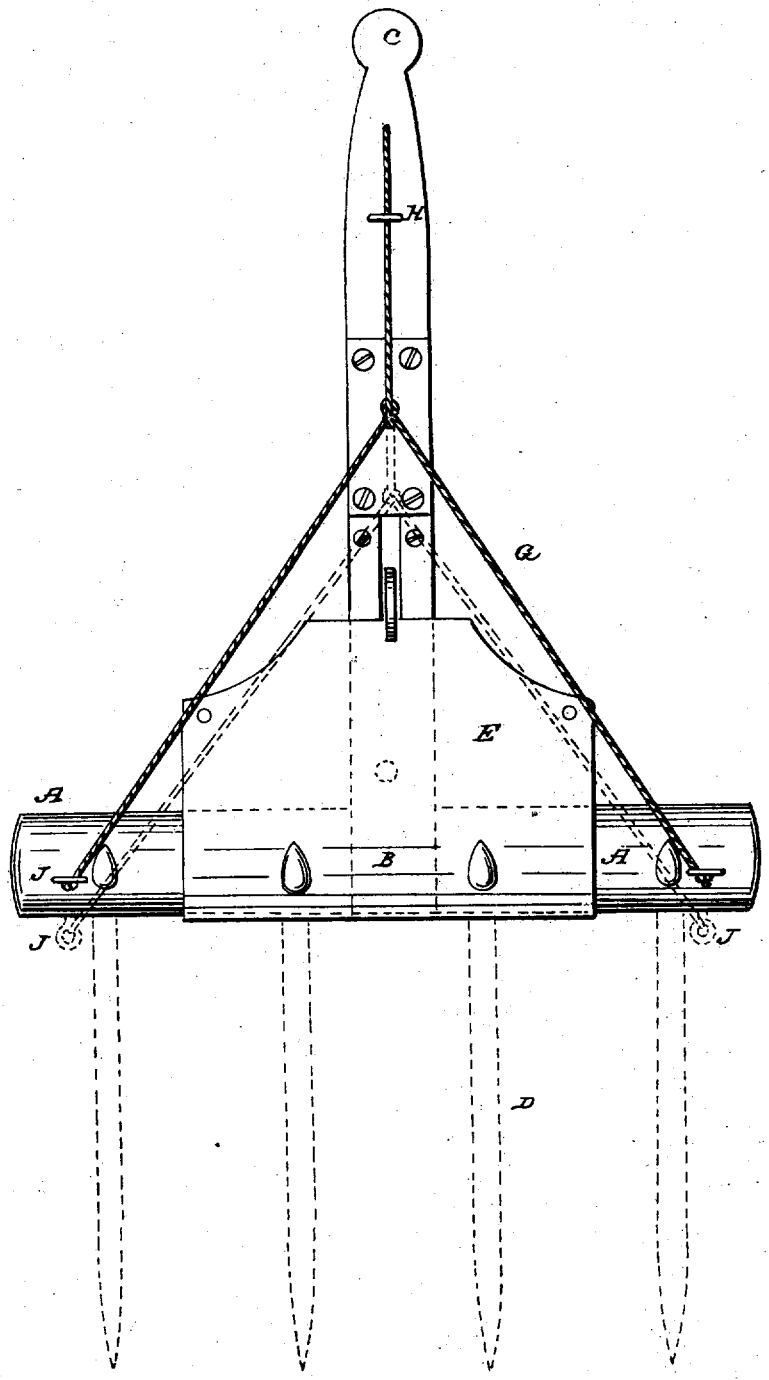
Figure 2:
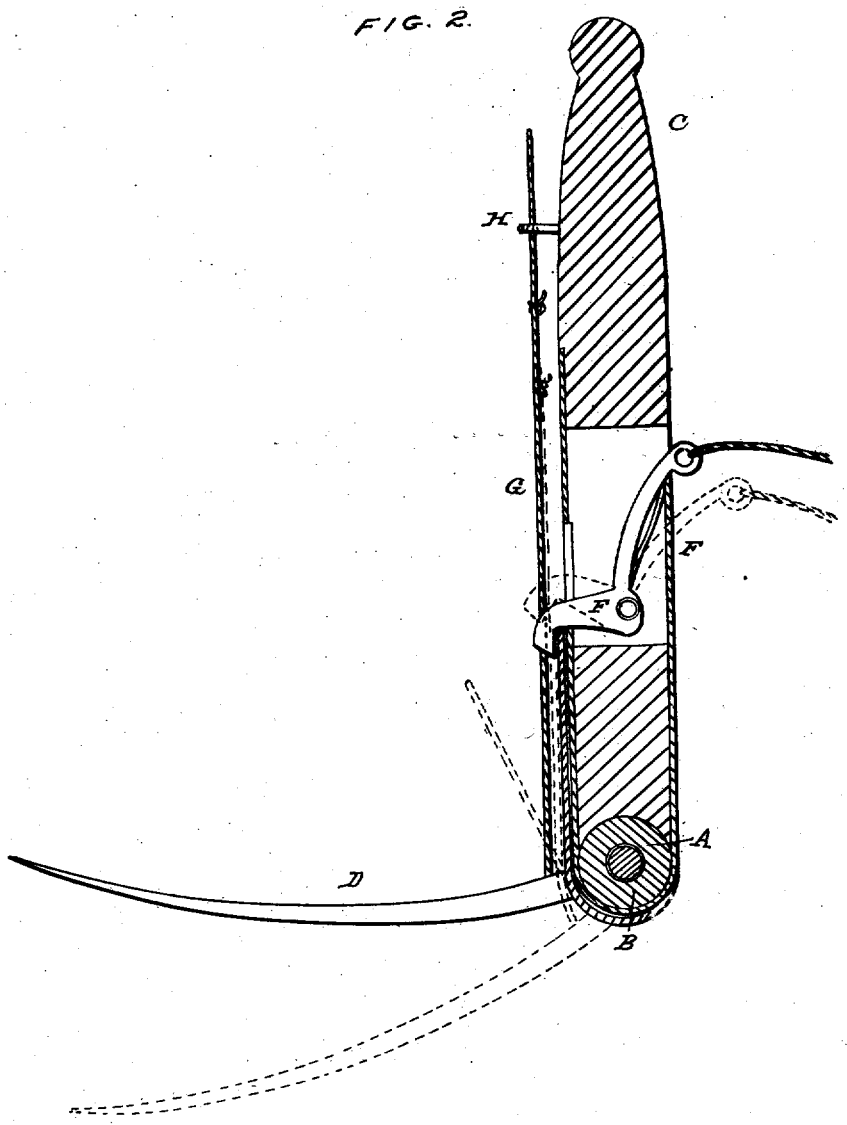

Figure 1, the dark lines represent a front view of the fork when in a hoisting position, and the red lines in Fig. 1 show the position of the head and handle when relieved of its load. Fig. 2 shows a side view of the fork, with the spring-catch acting upon the latch.

To enable others to make and use said invention, I will describe the same with reference to the drawings.

I take a piece of hard wood for the head A, about two feet long, three by three, and turn a groove, B, around the center of said head, about two inches wide and one-quarter of an inch deep, for the purpose of receiving a piece of band-iron of a corresponding size with said groove for the purpose of attaching the head of the fork to the handle C. I then bore the holes in said head for the purpose of receiving the tines D. Said tines are made of either round or square iron or steel, about sixteen inches long by five-eighths of an inch thick, and can be made either crooked or straight tines. I then take a stick about two feet long and form the handle C, fitting the lower end to the groove in the center of the head. I then take a piece of band-iron of the size to fit the groove in the head of the fork, and of sufficient length to extend around the head and up both sides of the handle—say six inches on each side—and clasp it around the head in said groove and secure it to the handle by bolts or screws, which, when so secured, form the band or box in which the said fork revolves. I then fit a piece of iron or wood to the front part of the head, which receives the two center tines and extends around the front part of the head and up in front of the handle—say six inches—which iron or wood forms both a brace and the latch E, which prevents the fork from revolving when loaded for elevation. I then mortise a hole in the handle, directly over the top of the latch, for the purpose of fastening a lever spring-catch, which lever spring-catch F drops over the top of the latch and firmly secures the same. I then attach to the lever part of said spring-catch a cord, which passes down the back side of the fork-handle, by means of which the fork is relieved from its load when required. I then take a piece of rope, G, about five feet long, and attach each end to the ring-staples J J in the front part of the head, at the outer ends, allowing the center of the rope G to extend up the front of the handle to within one or two inches of the staple H, which is placed nearly to the top of the handle on the front side, and through which the hoisting-rope passes.

I claim as said invention and desire to secure by Letters Patent—

1. Constructing a hay-elevating fork in such manner that while the head revolves, the handle, attached centrally thereto, remains in a vertical position.

2. In combination with the revolving head and vertical handle, the strap or band passing around the head near or at its center and attached to the handle in which the head revolves.

3. The sustaining-eye or its equivalent, through which the hoisting-rope passes for the purpose of keeping the fork in a proper position.

4. The latch E and the spring-catch F, in combination with the revolving head A, handle C, and sustaining-eye H, as and for the purpose herein described.

GEO. W. GREGORY.

Witnesses:
R. H. WALMSLEY,
NORRIS PETERS.